US012755144B2

(12) United States Patent
Kurasawa et al.

(10) Patent No.: US 12,755,144 B2
(45) Date of Patent: Oct. 6, 2026

(54) INFORMATION PROCESSING APPARATUS, ARITHMETIC METHOD, AND NON-TEMPORARY COMPUTER-READABLE MEDIUM

(71) Applicant: SEIKO EPSON CORPORATION, Tokyo (JP)

(72) Inventors: Hikaru Kurasawa, Shiojiri (JP); Kana Kanazawa, Shiojiri (JP); Ryoki Watanabe, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1532 days.

(21) Appl. No.: 17/333,222

(22) Filed: May 28, 2021

(65) Prior Publication Data

US 2021/0374534 A1 Dec. 2, 2021

(30) Foreign Application Priority Data

May 29, 2020 (JP) ................................ 2020-094200
May 29, 2020 (JP) ................................ 2020-094205
Sep. 30, 2020 (JP) ................................ 2020-164456

(51) Int. Cl.
*G06N 3/04* (2023.01)
*G06F 17/16* (2006.01)
*G06N 3/08* (2023.01)

(52) U.S. Cl.
CPC ............... *G06N 3/08* (2013.01); *G06F 17/16* (2013.01); *G06N 3/04* (2013.01)

(58) Field of Classification Search
CPC ............. G06N 3/08; G06N 3/04; G06F 17/16
See application file for complete search history.

(56) References Cited

U.S. PATENT DOCUMENTS 5,210,798 A 5/1993 Ekchian et al.
2019/0295228 A1* 9/2019 Liu .......................... G06T 5/60

FOREIGN PATENT DOCUMENTS

CN 109446985 A 3/2019
CN 110825849 A * 2/2020 ......... G06F 16/3329
(Continued)

OTHER PUBLICATIONS

Rahul Katarya, etc., "Study on Text Classification using Capsule Networks", published by Jun. 3, 2019 via 2019 5th International Conference on Advanced Computing & Communication Systems (ICACCS), retrieved Sep. 17, 2024. (Year: 2019).*
(Continued)

*Primary Examiner* — Shourjo Dasgupta
(74) *Attorney, Agent, or Firm* — Oliff PLC

(57) ABSTRACT

An apparatus including: memory that stores a machine learning model of a vector neural; and one or more processors that execute an arithmetic operation. The machine model has a plurality of vector neuron layers each including a plurality of nodes. When one of the plurality of vector layers is referred to as an upper layer and a vector layer below is referred to as a lower layer, one or more processors execute outputting one output vector by using output vectors from the plurality of nodes of the lower layer as an input for each node of the upper layer, the outputting including: obtaining a prediction vector, obtaining a sum vector based on a linear combination of the vectors, obtaining a normalization coefficient, and obtaining the output vector of the target node by dividing the sum vector by the norm and multiplying the divided sum vector by the normalization coefficient.

9 Claims, 4 Drawing Sheets

(56) References Cited

FOREIGN PATENT DOCUMENTS

| | | | | | |
|---|---|---|---|---|---|
| CN | 111191660 A | * | 5/2020 | .............. | G06K 9/46 |
| JP | 2017520974 A | * | 7/2017 | | |
| WO | 2019-083553 A1 | | 5/2019 | | |

OTHER PUBLICATIONS

Janos Hollosi, etc., "Training Capsule Networks with Various Parameters", published May 29-May 31, 2019 via IEEE 13th International Symposium on Applied Computational Intelligence and Informatics, Timisoara, Romania, retrieved Sep. 17, 2024. (Year: 2019).*

Michael Hauser, "Training capsules as a routing-weighted product of expert neurons", published Jul. 26, 2019 in arXiv, retrieved Sep. 17, 2024. (Year: 2019).*

Canqun Xiang, etc., "MS-CapsNet: A Novel Multi-Scale Capsule Network", published in IEEE Signal Processing Letters, vol. 25, No. 12, Dec. 2018, retrieved Sep. 17, 2024. (Year: 2018).*

Jeremy Jordan, "Normalizing your data (specifically, input and batch normalization)", published Jan. 26, 2018 to https://www.jeremyjordan.me/batch-normalization, retrieved Sep. 18, 2024. (Year: 2018).*

FreeText Library, "Normalization", published on Nov. 12, 2008 to https://www.freetext.org/Introduction_to_Linear_Algebra/Basic_Vector_Operations/Normalization, retrieved Apr. 2, 2025. (Year: 2008).*

Isabella Lindgren, "Transformations, Scaling and Normalization", published on Jul. 25, 2019 to https://medium.com/@isalindgren313/transformations-scaling-and-normalization-420b2be12300, retrieved Apr. 2, 2025. (Year: 2019).*

Towards AI, "How, When, and Why Should You Normalize / Standardize / Rescale Your Data?", published on May 16, 2019 to https://towardsai.net/p/data-science/how-when-and-why-should-you-normalize-standardize-rescale-your-data-3f083def38ff, retrieved Apr. 2, 2025. (Year: 2019).*

Lei Zhao, etc., "Exploring Dynamic Routing as a Pooling Layer", published via 2019 IEEE/CVF International Conference on Computer Vision Workshop (ICCVW), pp. 738-742 (2019), retrieved Aug. 26, 2025. (Year: 2019).*

Zafar, "Beginner's Guide to Capsule Networks", published on Mar. 30, 2018 to https://www.kaggle.com/code/fizzbuzz/beginner-s-guide-to-capsule-networks, retrieved Dec. 13, 2025. (Year: 2018).*

Cezanna Camacho, "Capsule Networks", published on Nov. 17, 2018 to https://cezannec.github.io/Capsule_Networks, retrieved 1Dec. 13, 2025. (Year: 2018).*

Sanjib Kumar Sahu, etc., "Dynamic Routing Using Inter Capsule Routing Protocol Between Capsules", published via 2018 UKSim-AMSS 20th International Conference on Modelling & Simulation, retrieved Dec. 13, 2025. (Year: 2018).*

Irene Li, "Deep Learning 16: Understanding Capsule Nets", published on Jan. 23, 2018 to https://ireneli.eu/2018/01/23/deep-learning-16-understanding-capsule-nets, retrieved Dec. 13, 2025. (Year: 2018).*

Edgar Xi, etc., "Capsule Network Performance on Complex Data", published on Dec. 10, 2017 to arXiv, retrieved Dec. 13, 2025. (Year: 2017).*

Sara Sabour, etc., "Dynamic Routing Between Capsules", published on Nov. 7, 2017 to arXiv, retrieved Dec. 13, 2025. (Year: 2017).*

Bohan Jia, etc., "DE-CapsNet: A Diverse Enhanced Capsule Network with Disperse Dynamic Routing", published on Jan. 29, 2020 to Applied Sciences, retrieved Dec. 13, 2025. (Year: 2020).*

Yiwei Wang, etc., "Capsule Networks Showed Excellent Performance in the Classification of hERG Blockers/Nonblockers", published on Jan. 28, 2020 to Frontiers in Pharmacology, retrieved Dec. 13, 2025. (Year: 2020).*

Taeyong Hahn, etc., "Self-Routing Capsule Networks", published via 33rd Conference on Neural Information Processing Systems (NeurIPS 2019), Vancouver, Canada, retrieved Dec. 13, 2025. (Year: 2019).*

David Peer, etc., "Limitation of Capsule Networks", published Jan. 19, 2021 to arXiv, retrieved Dec. 13, 2025. (Year: 2021).*

Hinton, Geoffrey et al.;"Matrix Capsules with EM Routing"; Published as a conference paper at ICLR 2018; pp. 1-15.

Sabour, Sara et al.; "Dynamic Routing Between Capsules"; 31st Conference on Neural Information Processing Systems; (NIPS 2017); pp. 1-11.

* cited by examiner

KSG_ConvVN1 KSG_ConvVN2 KSG_ClassVN

| No. | LAYER NAME | LABEL Lb | KNOWN FEATURE SPECTRUM KSp |
|---|---|---|---|
| 1 | ConvVN1 | 0 | ...................................... |
| 2 | ConvVN1 | 0 | ...................................... |
| ... | ... | ... | ...................................... |
| N1_0max | ConvVN1 | 0 | ...................................... |
| 1 | ConvVN1 | 1 | ...................................... |
| 2 | ConvVN1 | 1 | ...................................... |
| ... | ... | ... | ...................................... |
| N1_1max | ConvVN1 | 1 | ...................................... |

INFORMATION PROCESSING APPARATUS, ARITHMETIC METHOD, AND NON-TEMPORARY COMPUTER-READABLE MEDIUM

The present application is based on, and claims priority from JP Application Serial Number 2020-164456, filed Sep. 30, 2020, JP Application Serial Number 2020-094200, filed May 29, 2020, and JP Application Serial Number 2020-094205, filed May 29, 2020, the disclosures of which are hereby incorporated by reference herein in its entirety.

BACKGROUND

1. Technical Field

The present disclosure relates to an information processing apparatus using a machine learning model, an arithmetic method, and a non-temporary computer-readable medium.

2. Related Art

U.S. Pat. No. 5,210,798 and International Publication No. 2019/083553 disclose what is called a capsule network as a machine learning model using a vector neuron. The vector neuron means a neuron of which an input and an output is a vector. The capsule network is a machine learning model in which the vector neuron called a capsule is a node of a network. In the capsule network, the internal parameters are searched by repeating dynamic routing a plurality of times when obtaining an output vector of each layer.

However, in the capsule network, since it is necessary to repeat dynamic routing a plurality of times, there is a problem that an arithmetic speed is slow.

SUMMARY

According to a first aspect of the present disclosure, an information processing apparatus is provided. This information processing apparatus includes: a memory that stores a machine learning model of a vector neural network type; and one or more processors that execute an arithmetic operation using the machine learning model. The machine learning model has a plurality of vector neuron layers each including a plurality of nodes, when one of the plurality of vector neuron layers is referred to as an upper layer and a vector neuron layer below the upper layer is referred to as a lower layer, the one or more processors are configured to execute outputting one output vector by using output vectors from the plurality of nodes of the lower layer as an input for each node of the upper layer. The outputting includes: when any node of the upper layer is referred to as a target node, (a) obtaining a prediction vector based on a product of the output vector of each node of the lower layer and a prediction matrix, (b) obtaining a sum vector based on a linear combination of the prediction vectors obtained from each node of the lower layer, (c) obtaining a normalization coefficient by normalizing a norm of the sum vector, and (d) obtaining the output vector of the target node by dividing the sum vector by the norm and then multiplying the divided sum vector by the normalization coefficient.

According to a second aspect of the present disclosure, there is provided a method of causing one or more processors to execute arithmetic processing using a machine learning model of a vector neural network type. The machine learning model has a plurality of vector neuron layers each including a plurality of nodes. When one of the plurality of vector neuron layers is referred to as an upper layer and a vector neuron layer below the upper layer is referred to as a lower layer, the one or more processors are configured to execute outputting one output vector by using output vectors from the plurality of nodes of the lower layer as an input for each node of the upper layer. The method causes the one or more processors to execute outputting one output vector by using output vectors from the plurality of nodes of the lower layer as an input for each node of the upper layer, and the outputting includes: when any node of the upper layer is referred to as a target node, (a) obtaining a prediction vector based on a product of the output vector of each node of the lower layer and a prediction matrix, (b) obtaining a sum vector based on a linear combination of the prediction vectors obtained from each node of the lower layer, (c) obtaining a normalization coefficient by normalizing a norm of the sum vector, and (d) obtaining the output vector of the target node by dividing the sum vector by the norm and then multiplying the divided sum vector by the normalization coefficient.

According to a third aspect of the present disclosure, there is provided a non-temporary computer-readable medium that stores instructions for causing one or more processors to execute arithmetic processing using a machine learning model of a vector neural network type. The machine learning model has a plurality of vector neuron layers each including a plurality of nodes. When one of the plurality of vector neuron layers is referred to as an upper layer and a vector neuron layer below the upper layer is referred to as a lower layer, the one or more processors are configured to execute outputting one output vector by using output vectors from the plurality of nodes of the lower layer as an input for each node of the upper layer. The instructions causes the one or more processors to execute outputting one output vector by using output vectors from the plurality of nodes of the lower layer as an input for each node of the upper layer, and the outputting includes: when any node of the upper layer is referred to as a target node, (a) obtaining a prediction vector based on a product of the output vector of each node of the lower layer and a prediction matrix, (b) obtaining a sum vector based on a linear combination of the prediction vectors obtained from each node of the lower layer, (c) obtaining a normalization coefficient by normalizing a norm of the sum vector, and (d) obtaining the output vector of the target node by dividing the sum vector by the norm and then multiplying the divided sum vector by the normalization coefficient.

DESCRIPTION OF EXEMPLARY EMBODIMENTS

Figure 1:
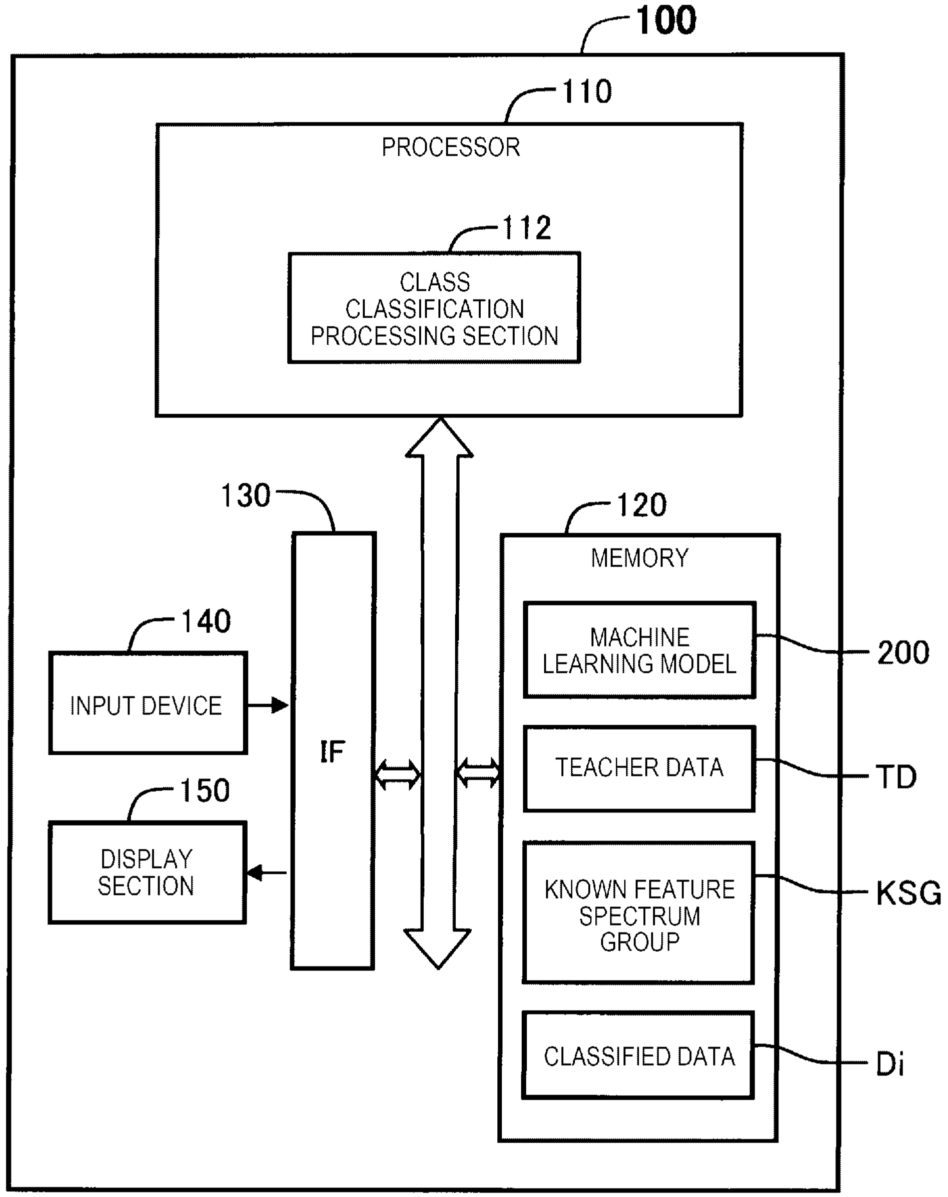
FIG. 1 is a block diagram of an information processing apparatus according to an embodiment.

FIG. 1 is a block diagram illustrating a function of an information processing apparatus 100 according to an embodiment. The information processing apparatus 100 includes a processor 110, a memory 120, an interface circuit 130, an input device 140 and a display section 150 coupled to the interface circuit 130. Although not limited, for example, the processor 110 not only has a function of executing processing described in detail below, but also a function of displaying data obtained by the processing and data generated in a process of the processing, on the display section 150. The information processing apparatus 100 can be realized by a computer such as a personal computer.

The processor 110 functions as a class classification processing section 112 that executes class classification processing of input data. The class classification processing section 112 is realized by the processor 110 executing a computer program stored in the memory 120. However, the class classification processing section 112 may be realized by a hardware circuit. The term processor in the present specification is a term that also includes such a hardware circuit. The memory 120 stores a machine learning model 200 of a vector neural network type, teacher data TD, a known feature spectrum group KSG, and classified data Di. The machine learning model 200 is used for performing an arithmetic by the class classification processing section 112. A configuration example and an operation of the machine learning model 200 will be described later. The teacher data TD is labeled data used for learning of the machine learning model 200. The known feature spectrum group KSG is a set of feature spectra obtained when the teacher data TD is input again to the learned machine learning model 200. The feature spectrum will be described later. The classified data Di is new input data which is a processing target of the class classification processing. The teacher data TD is required only when performing the learning of the machine learning model 200, and is not required when executing the class classification processing for the classified data Di. Further, the classified data Di does not need to be stored in the memory 120 when performing the learning of the machine learning model 200.

As described above, the information processing apparatus 100 has a function as a class classification device that performs the class classification processing. However, the information processing apparatus 100 can be configured to perform arithmetic processing other than the class classification processing, and for example, can be configured to execute evaluation value calculation processing for calculating a continuous value which is an evaluation value of input data. Generally, the processor 110 functions as an arithmetic section that executes an arithmetic using the machine learning model 200.

Figure 2:
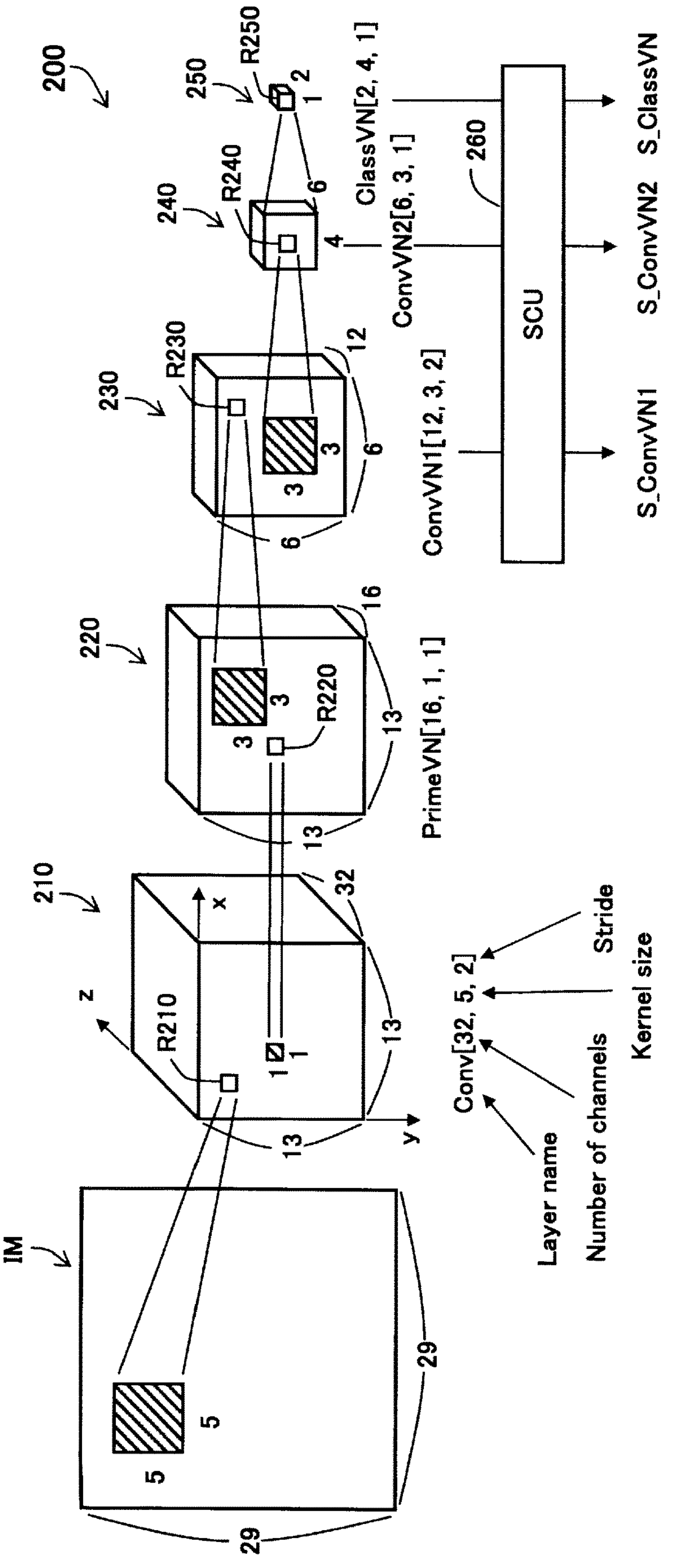
FIG. 2 is an explanatory diagram illustrating a configuration of a machine learning model.

FIG. 2 is an explanatory diagram illustrating a configuration of the machine learning model 200. The machine learning model 200 includes a convolution layer 210, a primary vector neuron layer 220, a first convolution vector neuron layer 230, a second convolution vector neuron layer 240, and a classification vector neuron layer 250 in this order from an input data IM side. Of these five layers 210 to 250, the convolution layer 210 is the lowest layer, and the classification vector neuron layer 250 is the highest layer. In the following description, the layers 210 to 250 are also referred to as "Conv layer 210", "PrimeVN layer 220", "ConvVN1 layer 230", "ConvVN2 layer 240", and "ClassVN layer 250", respectively.

In the example of FIG. 2, two convolution vector neuron layers 230 and 240 are used, but the number of convolution vector neuron layers is optional, and the convolution vector neuron layer may be omitted. However, it is preferable to use one or more convolution vector neuron layers.

The machine learning model 200 of FIG. 2 further has a similarity arithmetic section 260 that generates a similarity. The similarity arithmetic section 260 can calculate similarities S_ConvVN1, S_ConvVN2, and S_ClassVN, which will be described later, from the outputs of the ConvVN1 layer 230, the ConvVN2 layer 240, and the ClassVN layer 250, respectively. However, the similarity arithmetic section 260 may be omitted.

A configuration of each of the layers 210 to 250 can be described as follows.

Description of Configuration of Each Layer

Conv layer 210: Conv [32,5,2]

PrimeVN layer 220: PrimeVN [16,1,1]

ConvVN1 layer 230: ConvVN1 [12,3,2]

ConvVN2 layer 240: ConvVN2 [6,3,1]

ClassVN layer 250: ClassVN [2,4,1]

Vector dimension VD: VD=16

In the description of each of these layers 210 to 250, the character string before the parentheses is the layer name, and the numbers in the parentheses are the number of channels, a kernel size, and a stride in order. For example, the layer name of the Conv layer 210 is "Conv", the number of channels is 32, the kernel size is 5×5, and the stride is two. In FIG. 2, these descriptions are illustrated below each layer. A hatched rectangle drawn within each layer represents the kernel used when calculating the output vector of an adjacent upper layer. The parameter values used in the description of each of the layers 210 to 250 are examples and can be changed optionally.

The Conv layer 210 is a layer configured of scalar neurons. The other four layers 220 to 250 are layers configured of vector neurons. The vector neuron is a neuron that inputs and outputs a vector. In the above description, the dimension of the output vector of each vector neuron is constant at 16. In the following, the term "node" will be used as a superordinate concept of the scalar neuron and the vector neuron.

In FIG. 2, for the Conv layer 210, a first axis x and a second axis y that define plane coordinates of a node array and a third axis z that represents a depth are illustrated. Further, it is illustrated that the sizes of the Conv layer 210 in the x, y, and z directions are 13, 13, and 32. The size in the x direction and the size in the y direction are called "resolution". In this example, the resolutions in the x and y directions are equal, but may be different. The size in the z direction is the number of channels. These three axes x, y, and z are also used as coordinate axes indicating a position of each node in other layers. However, in FIG. 2, the axes x, y, and z are not illustrated in the layers other than the Conv layer 210.

As is well known, a resolution W1 after convolution is given by the following equation.

$$W1=\mathrm{Ceil}\{(W0-Wk+1)/S\} \quad (1)$$

Here, W0 is the resolution before convolution, Wk is the kernel size, S is the stride, and Ceil {X} is a function that performs an arithmetic that rounds up X.

The resolution of each layer illustrated in FIG. 2 is an example when the resolution of the input data IM is 29×29 pixels, and an actual resolution of each layer is appropriately changed according to the size of the input data IM. In the example of FIG. 2, the input data IM is two-dimensional array data, but it may be one-dimensional array data or three-dimensional or more array data.

Each node of the PrimeVN layer 220 regards the scalar output of the 1×1×32 nodes of the Conv layer 210 as a 32-dimensional vector, and multiplies this vector by a transformation matrix to obtain a vector output of that node. This transformation matrix is an element of the 1×1 kernel and is updated by performing the learning of the machine learning model 200. It is also possible to integrate the processing of the Conv layer 210 and the PrimeVN layer 220 to form one primary vector neuron layer.

When the PrimeVN layer 220 is called the "lower layer L", the ConvVN1 layer 230 adjacent thereto an upper side is called the "upper layer L+1", and an output of each node of the upper layer L+1 is determined by using the following equation.

[Math. 1]

$$v_{ij} = W_{ij}^{L} M_{i}^{L} \quad (2)$$

$$u_j = \sum_i v_{ij} \quad (3)$$

$$a_j = F(\|u_j\|) \quad (4)$$

$$M_j^{L+1} = a_j \times \frac{1}{\|u_j\|} u_j. \quad (5)$$

Here, $M^{L}_{i}$ is an output vector of an i-th node in the lower layer L, $M^{L+1}_{j}$ is an output vector of a j-th node in the upper layer L+1, $v_{ij}$ is a prediction vector of the output vector $M^{L+1}_{j}$, $W^{L}_{ij}$ is a prediction matrix for calculating the prediction vector $v_{ij}$ from the output vector $M^{L}_{i}$ of the lower layer L, $u_j$ is a sum of the prediction vectors $v_{ij}$, that is, a linear combination, a sum vector, $a_j$ is an activation value, which is a normalization coefficient obtained by normalizing the norm $|u_j|$ of the sum vector $u_j$, and F(X) is a normalization function that normalizes X.

As the normalization function F(X), for example, the following equation (4a) or equation (4b) can be used.

[Math. 2]

$$a_j = F(\|u_i\|) = \mathrm{softmax}(\|u_j\|) = \frac{\exp(\beta\|u_i\|)}{\sum_k \exp(\beta\|u_k\|)} \quad (4a)$$

$$a_j = F(\|u_j\|) = \frac{\|u_j\|}{\sum_k \|u_k\|}. \quad (4b)$$

Here, k is an ordinal number for all nodes of the upper layer L+1, and

β is an adjustment parameter that is an optional positive coefficient, for example β=1.

In the above equation (4a), the activation value $a_j$ is obtained by normalizing the norm $|u_j|$ of the sum vector $u_j$ for all the nodes of the upper layer L+1 with a Softmax function. On the other hand, in equation (4b), the activation value $a_j$ is obtained by dividing the norm $|u_j|$ of the sum vector $u_j$ by the sum of the norms $|u_j|$ for all the nodes of the upper layer L+1. As the normalization function F(X), a function other than the equation (4a) or the equation (4b) may be used.

The ordinal number i of the above equation (3) is conveniently assigned to the node of the lower layer L used to determine the output vector $M^{L+1}_{j}$ of the j-th node in the upper layer L+1 and it takes a value of 1 to n. Further, the integer n is the number of nodes of the lower layer L used to determine the output vector $M^{L+1}_{j}$ of the j-th node in the upper layer L+1. Therefore, the integer n is given by the following equation.

$$n = Nk \times Nc \quad (6)$$

Here, Nk is the number of kernel elements, and Nc is the number of channels of the PrimeVN layer 220 that is the lower layer. In the example of FIG. 2, since Nk=9 and Nc=16, n=144.

One kernel used to obtain the output vector of the ConvVN1 layer 230 has 3×3×16=144 elements having a kernel size of 3×3 as the surface size and a depth of 16 channels of the lower layer as the depth, and each of these elements is the prediction matrix $W^{L}_{ij}$. In addition, 12 sets of this kernel are required to generate output vectors of 12 channels of the ConvVN1 layer 230. Therefore, the number of the kernel prediction matrices $W^{L}_{ij}$ used to obtain the output vector of the ConvVN1 layer 230 is 144×12=1728. These prediction matrices $W^{L}_{ij}$ are updated by performing the learning of the machine learning model 200.

As can be seen from the above equations (2) to (5), the output vector $M^{L+1}_{j}$ of each node of the upper layer L+1 is obtained by the following arithmetic:

(a) obtaining the prediction vector $v_{ij}$ by multiplying the output vector $M^{L}_{i}$ of each node of the lower layer L by the prediction matrix $W^{L}_{ij}$, (b) obtaining the sum vector $u_j$, which is the sum of the prediction vectors $v_{ij}$ obtained from each node of the lower layer L, that is, the linear combination, (c) obtaining the activation value $a_j$, which is the normalization coefficient, by normalizing the norm $|u_j|$ of the sum vector $u_j$, and (d) dividing the sum vector $u_j$ by the norm $|u_j|$ and then multiplying by the activation value $a_j$.

The activation value $a_j$ is a normalization coefficient obtained by normalizing the norm $|u_j|$ for all the nodes of the upper layer L+1. Therefore, the activation value $a_j$ can be considered as an index indicating a relative output intensity of each node in all the nodes within the upper layer L+1. The norms used in equations (4), (4a), (4b), and (5) are L2 norms indicating vector lengths in a typical example. In this case, the activation value $a_j$ corresponds to the vector length of the output vector $M^{L+1}_{j}$. Since the activation value $a_j$ is only used in the above equations (4) and (5), it does not need to be output from the node. However, it is also possible to configure the upper layer L+1 so as to output the activation value $a_j$ to the outside.

The configuration of the vector neural network is substantially the same as the configuration of the capsule network, and the vector neuron of the vector neural network correspond to the capsule of the capsule network. However, the arithmetic according to the above equations (2) to (5) used in the vector neural network is different from the arithmetic used in the capsule network. A biggest difference between the two is that in the capsule network, the prediction vector $v_{ij}$ on the right side of the above equation (3) is multiplied by each weight, and the weight is searched by repeating dynamic routing a plurality of times. On the other hand, in the vector neural network of the present embodiment, the output vector $M^{L+1}_{j}$ j can be obtained by calculating the above equations (2) to (5) once in order, so that it has advantages that the dynamic routing does not need to be repeated and the arithmetic is performed at a higher speed. Further, the vector neural network of the present embodiment for arithmetic requires less memory than that of the capsule network, and according to an experiment of the inventor of the present disclosure, there is also an advantage that the amount of memory is about ½ to ⅓ of that of the capsule network.

The vector neural network is the same as the capsule network in that node that inputs and outputs the vector is used. Therefore, the advantages of using the vector neuron are also common to the capsule network. Further, the plurality of layers 210 to 250 are the same as those of the ordinary convolutional neural network in that the higher the number, the larger the feature of the region is expressed, and the lower the number, the smaller the feature of the region is expressed. Here, the "feature" means a characteristic portion included in the input data to the neural network. The vector neural network and the capsule network are superior to the ordinary convolutional neural network in that the output vector of a certain node includes spatial information that represents the spatial information of the feature expressed by that node. That is, the vector length of the output vector of a certain node represents an existence probability of the feature expressed by the node, and the vector direction represents spatial information such as a direction and a scale of the feature. Therefore, the vector directions of the output vectors of the two nodes belonging to the same layer represent a positional relationship of each feature. Alternatively, it can be said that the vector directions of the output vectors of the two nodes represent a variation of the features. For example, in a case of a node corresponding to a feature of a "spot", the direction of the output vector can represent a variation such as fineness of the spot and how to lift. In an ordinary convolutional neural network, it is said that the spatial information of the feature is lost by pooling processing. As a result, the vector neural network and the capsule network have an advantage that they are superior in the performance of identifying the input data as compared with that of the ordinary convolutional neural network.

The advantages of vector neural networks can also be considered as follows. That is, in the vector neural network, there is an advantage that the output vector of the node expresses the feature of the input data as coordinates in a continuous space. Therefore, the output vector can be evaluated so that the features are similar if the vector directions are close. In addition, even if the features included in the input data cannot be covered by the teacher data, there is an advantage that the features can be discriminated by interpolation. On the other hand, an ordinary convolutional neural network has a drawback that the feature of the input data cannot be expressed as the coordinates in the continuous space because disorderly compression is applied by the pooling processing.

Since the output of each node of the ConvVN2 layer 240 and the ClassVN layer 250 is also determined in the same manner using the above equations (2) to (5), detailed description thereof will be omitted. The resolution of the ClassVN layer 250, which is the uppermost layer, is 1×1, and the number of channels is two. The number of channels of the ClassVN layer 250 is usually set to be equal to the number of labels used in the teacher data.

A method of obtaining the output of the node of each layer 210 to 250 can also be described as follows. By applying a 5×5 kernel with stride "2" to the input data IM, a partial range that gives the output to one node of the Conv layer 210 is determined in a range of the input data IM. The number of kernels applied to the input data IM is 32. Therefore, the Conv layer 210 is configured so that the first axis x and the second axis y each have a region divided into 13. Further, the number of channels, which is the depth of the Conv layer 210, is configured of 32, which is the same number as the number of kernels. The "partial range" is a region on the input data IM, and is one region specified by the position of the first axis x and the position of the second axis y. However, as is clear from the following description, the size of the "partial range" varies depending on which of the vector neuron layers 220, 230, 240 and 250 one or more nodes corresponding to the "partial range" or a "partial region Rn" configured of the one or more nodes belongs to. On the other hand, the "partial region Rn" is a region specified by the position of the first axis x and the position of the second axis y in the vector neuron layer. Each "partial region Rn" in the vector neuron layer has a dimension of "Width"×"Height"×"Depth" corresponding to the first axis x, the second axis y, and the third axis z. In the present embodiment, the number of nodes included in one "partial region Rn" is "1×1×number of depths", that is, "1×1× number of channels". In the present specification, the subscripts "n" of the partial region Rn are substituted with the numerical values of "220", "230", "240", and "250" according to the vector neuron layers 220, 230, 240, and 250. For example, the partial region R220 indicates a region in the PrimeVN layer 220.

By applying the 1×1×32 kernel to the Conv layer 210 with stride "1", the partial region R210 to be output to one node of the PrimeVN layer 220 is determined from the partial region R210 of the Conv layer 210. Here, since 16 types of kernels are used with the same size and the same stride, the number of nodes corresponding to one partial region R210 of the Conv layer 210 is 16 in the PrimeVN layer 220. A transformation matrix is used to generate the output from the node of the Conv layer 210 to the node of the PrimeVN layer 220, and an output determination algorithm represented by the above equations (2) to (5) is not used. The kernel dimension for convoluting into the vector neuron layer may be expressed as "Width"×"Height"×"Depth"×"Number of vector elements" when the number of channels and the number of vector elements are also taken into consideration. According to this expression, the kernel dimensions used for convolution from the Conv layer 210 to the PrimeVN layer 220 are 1×1×32×16.

By applying a 3×3×16 kernel to the PrimeVN layer 220 with a stride "2", the partial region R220 giving an output from the partial region R220 of the PrimeVN layer 220 to the node included in one partial region R230 of the ConvVN1 layer 230 is determined. Here, since 12 types of kernels are used with the same size, the same dimension, and the same stride, the number of nodes included in the partial region R230 of the ConvVN1 layer 230 is 12. The output determination algorithms represented by the above equations (2) to (5) are used to generate the output from the node of the PrimeVN layer 220 to the node of the ConvVN1 layer 230. Here, the kernel applied to the lower layer 220 is also expressed as designating 3×3×16 nodes of the lower layer 220 used to determine one node of the upper layer 230. This also applies to the following explanation.

By applying the 3×3×12 kernel to the ConvVN1 layer 230 with stride "1", the partial region R230 giving an output from the partial region R230 of the ConvVN1 layer 230 to one partial region R240 of the ConvVN2 layer 240 is determined. Here, since six types of kernels are used with the same size, the same dimension, and the same stride, the number of nodes included in the partial region R240 of the ConvVN2 layer 240 is 6. When the node of ConvVN2 layer 240 is generated from the node of the ConvVN1 layer 230, the output determination algorithms represented by the above equations (2) to (5) are used.

By applying a 4×4×6 kernel to the ConvVN2 layer 240 with stride "1", the partial region R240 giving an output from the partial region R240 of the ConvVN2 layer 240 to one partial region R250 of the ClassVN layer 250 is determined. Here, since two types of kernels are used with the same size, the same dimension, and the same stride, the number of nodes included in the partial region R250 of the ClassVN layer 250 is two. When the node of ClassVN layer 250 is generated from the node of the ConvVN2 layer 240, the output determination algorithms represented by the above equations (2) to (5) are used.

The ClassVN layer 250 that is the uppermost layer is configured of one partial region R250. The ClassVN layer 250 classifies the input data IM input to the machine learning model 200 into predetermined labels. In the present embodiment, the predetermined labels are the label "0" and the label "1". In the ClassVN layer 250, the label corresponding to the node having the maximum activation value $a_j$ out of the two nodes is output. The label output from the ClassVN layer 250 is output by the display section 150 by being controlled by the processor 110.

In FIG. 2, one partial region R220 of the PrimeVN layer 220 corresponds to a partial range of 5×5 pixels of the input data IM. Further, one partial region R230 of the ConvVN1 layer 230 corresponds to a partial range of 9×9 pixels of the input data IM. Further, the partial region R240 of the ConvVN2 layer 240 corresponds to a partial range of 17×17 pixels of the input data IM. Further, the partial region R250 of the ClassVN layer 250 corresponds to a partial range of 29×29 pixels of the input data IM.

Figure 3:
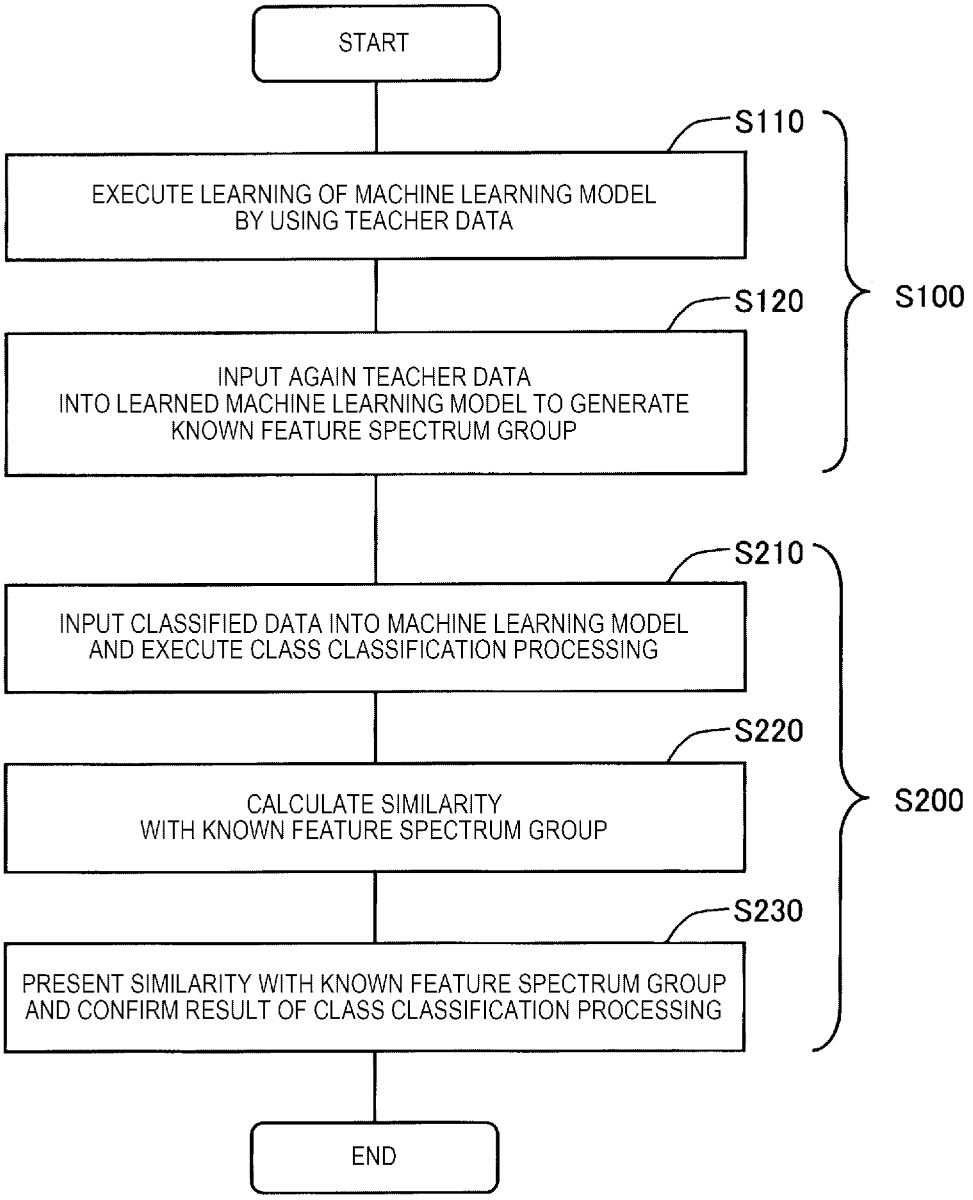
FIG. 3 is a flowchart illustrating a processing procedure of class classification processing.

FIG. 3 is a flowchart illustrating a processing procedure of the class classification processing. The first two steps S110 to S120 are preparatory steps S100 of performing the learning of the machine learning model 200 by using the teacher data TD, and the next three steps S210 to S230 are a class classification step S200 of discriminating the class of the classified data Di by using the learned machine learning model 200. It is not necessary to continuously perform the preparation step S100 and the class classification step S200, and the class classification step S200 can be executed at any timing after the preparation step S100.

In step S110 of FIG. 3, the class classification processing section 112 executes the learning of the machine learning model 200 by using a plurality of teacher data TDs. The individual teacher data TDs are pre-labeled. In the present embodiment, it is assumed that any of the labels 0 and 1 is attached to the individual teacher data TD.

The output of the ClassVN layer 250 is converted into a plurality of discrimination values for the number of classes equal to the number of labels, but the illustration is omitted in FIG. 2. In the present embodiment, the outputs of the two nodes of the ClassVN layer 250 are converted into the discrimination values for the two classes corresponding to the two labels "0" and "1". These discrimination values are ordinary values normalized by the Softmax function. Specifically, for example, an arithmetic is executed in which the vector length of the output vector is calculated from the output vector of each node of the ClassVN layer 250, and the vector lengths of the two nodes are normalized by the Softmax function. Therefore, the discrimination values for the two classes can be obtained. As described above, the activation value $a_j$ obtained by the above equation (4) is a value corresponding to the vector length of the output vector $M^{L+1}_j$ and is normalized. Therefore, the activation value $a_j$ in each of the two nodes of the ClassVN layer 250 may be output and used as it is as the discrimination value for the two classes.

When the learning using the plurality of teacher data TD is completed, the learned machine learning model 200 is stored in the memory 120. In step S120 of FIG. 3, the plurality of teacher data TD are input again into the learned machine learning model 200 to generate the known feature spectrum group KSG. The known feature spectrum group KSG is a set of feature spectra described below.

Figures 4, 5:
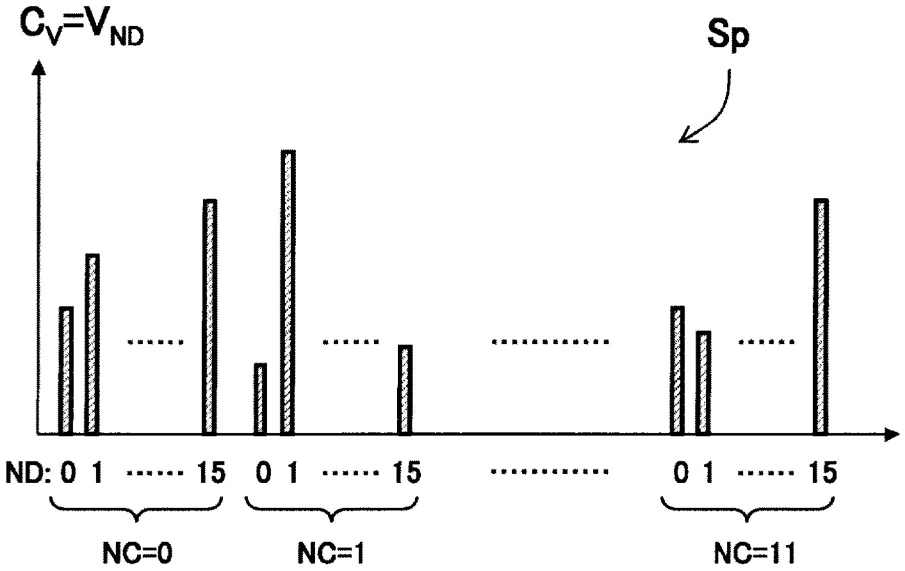
FIG. 4 is an explanatory diagram illustrating a feature spectrum.
FIG. 5 is an explanatory diagram illustrating a configuration of a known feature spectrum group.

FIG. 4 is an explanatory diagram illustrating a feature spectrum Sp obtained by inputting any input data into the learned machine learning model 200. Here, the feature spectrum Sp obtained from the output of the ConvVN1 layer 230 will be described. A horizontal axis of FIG. 4 is a spectral position represented by a combination of the element number ND of the output vector of the node at one plane position (x, y) of the ConvVN1 layer 230 and the channel number NC. In the present embodiment, since the vector dimension of the node is 16, the element numbers ND of the output vector are 16 from 0 to 15. Further, since the number of channels of the ConvVN1 layer 230 is 12, the channel numbers NC are 12 from 0 to 11.

A vertical axis of FIG. 4 illustrates a feature value $C_V$ at each spectral position. In this example, the feature value $C_V$ is a value $V_{ND}$ of each element of the output vector. As the feature value $C_V$, a value $V_{ND}$×$a_j$ obtained by multiplying the value $V_{ND}$ of each element of the output vector by the activation value $a_j$ of the node may be used or the activation value $a_j$ may be used as it is. In the latter case, the number of feature values $C_V$ included in the feature spectrum Sp is equal to the number of channels, which is 12.

Since the number of feature spectra Sp obtained from the output of the ConvVN1 layer 230 for one input data is equal to the number of plane position (x, y) of the ConvVN1 layer 230, 6×6=36. Similarly, for one input data, 16 feature spectra Sp are obtained from the output of the ConvVN2 layer 240, and one feature spectrum Sp is obtained from the output of the ClassVN layer 250.

When the teacher data TD is input again to the learned machine learning model 200, the similarity arithmetic section 260 calculates the feature spectrum Sp illustrated in FIG. 4 and registers it in the known feature spectrum group KSG.

FIG. 5 is an explanatory diagram illustrating a configuration of the known feature spectrum group KSG. In this example, the known feature spectrum group KSG includes a known feature spectrum group KSG_ConvVN1 obtained from the output of the ConvVN1 layer 230, a known feature spectrum group KSG ConvVN2 obtained from the output of the ConvVN2 layer 240, and a known feature spectrum group KSG ConvVN1 obtained from the output of the ClassVN layer 250.

Each record of the known feature spectrum group KSG ConvVN1 includes the record number, the layer name, the label Lb, and the known feature spectrum KSp. Further, each record may include other items such as an individual data name of the teacher data TD and upper left coordinates of a portion corresponding to the feature spectrum Sp in the input data IM. The known feature spectrum KSp is the same as the feature spectrum Sp in FIG. 4 obtained according to the input of the teacher data TD. In the example of FIG. 5, by inputting the plurality of teacher data TDs into the learned machine learning model 200, from the output of the ConvVN1 layer 230, N1_0max known feature spectra KSp associated with the label Lb=0 and N1_1max known feature spectra KSp associated with the label Lb=1 are obtained and registered. N1_0max and N1_1max are integers of 2 or more, respectively. As described above, the label Lb=0 and the label Lb=1 correspond to different classes. Therefore, it can be understood that each known feature spectrum KSp in the known feature spectrum group KSG_ConvVN1 is associated with one of a plurality of classes to be registered. The same applies to the other known feature spectrum groups KSG_ConvVN2 and KSG_ConvVN1.

The plurality of teacher data TD used in step S120 need not be the same as the plurality of teacher data TD used in step S110. However, also in step S120, if a part or all of the plurality of teacher data TD used in step S110 is used, there is an advantage that it is not necessary to prepare new teacher data.

In step S210 of FIG. 3, the class classification processing section 112 inputs the classified data Di into the machine learning model 200 and executes the class classification processing of the classified data Di. In the present embodiment, it is discriminated which class of the two labels Lb=0 and Lb=1 the classified data Di is classified into. The two outputs from the ClassVN layer 250 are a first discrimination value indicating a probability corresponding to the class of label Lb=0 and a second discrimination value indicating a probability corresponding to the class of label Lb=1. The class classification processing section 112 presents to a user a class corresponding to a discrimination value larger than a predetermined threshold value of these two discrimination values, as a result of the class classification processing.

In step S220 of FIG. 3, the similarity arithmetic section 260 calculates the similarities S_ConvVN1, S_ConvVN2, and S_ClassVN with the known feature spectrum group KSG, from the outputs of the ConvVN1 layer 230, the ConvVN2 layer 240, and the ClassVN layer 250, respectively. The method of calculating the similarity S_ConvVN1 from the output of the ConvVN1 layer 230 will be described below.

The similarity arithmetic section 260 can calculate one of two types of similarities, a similarity image S_ConvVN1_M and a similarity S_ConvVN1_C for each class, as the similarity S_ConvVN1 with the known feature spectrum group KSG. In FIG. 1, the trailing "_M" and "_C" of these codes are omitted.

The similarity S(x, y) at each pixel position (x, y) of the similarity image S_ConvVN1_M can be obtained according to the following equation by using the known feature spectrum group KSG illustrated in FIG. 5.

$$S(x,y)=\max[G\{Sp(x,y),KSp(j)\}] \quad (7)$$

Here, G {a, b} indicates a function for obtaining the similarity between a and b, and Sp (x, y) indicates a feature spectrum at the plane position (x, y) of the ConvVN1 layer 230 obtained according to the classified data Di, KSp (j) indicates all known feature spectra associated with the ConvVN1 layer 230, and max [X] indicates a logical arithmetic that takes the maximum value of X. That is, the similarity S(x, y) at each pixel position (x, y) is the maximum value of the similarities between the feature spectrum Sp (x, y) obtained according to the classified data Di and all known feature spectra KSp (j) obtained in the same ConvVN1 layer 230.

As the function G {a, b} for obtaining the similarity, for example, an equation for obtaining a cosine similarity or an equation for obtaining the similarity according to a distance can be used. The pixel value at each position (x, y) is stored in a form including the label Lb associated with the known feature spectrum KSp (j) given the maximum value in the above equation (7) in addition to the similarity S (x, y). The similarity S(x, y) of the similarity image S_ConvVN1_M represents a probability that the feature of the class corresponding to the label Lb exists at the pixel position of the classified data Di corresponding to the position (x, y). In other words, the similarity S (x, y) is an index indicating a degree to which the feature of the layer at the plane position (x, y) is similar to the feature of any one of the plurality of classes.

On the other hand, the similarity S_ConvVN1_C for each class can be calculated by using, for example, the following equation.

$$S\_ConvVN1\_C(\mathrm{Class})=\max[G\{Sp(i,j),KSp(\mathrm{Class},k)\}] \quad (8)$$

Here, the "Class" represents an ordinal number for a plurality of classes, G{a, b} represents a function for obtaining the similarity between a and b, Sp(i, j) represents the feature spectrum at all plane positions (i, j) obtained according to the classified data Di, KSp(Class, k) represents all known feature spectra associated with the ConvVN1 layer 230 and the particular "Class", and max[X] represents the logical arithmetic that takes the maximum value of X. That is, the similarity S_ConvVN1_C for each class is the maximum value of the similarity calculated between each of the feature spectra Sp(i, j) at all plane positions (i, j) of the ConvVN1 layer 230 and each of all known feature spectra KSp(k) corresponding to the specific class. Such a similarity S_ConvVN1_C for each class is obtained for each of a plurality of classes corresponding to a plurality of labels Lb. The similarity S_ConvVN1_C for each class indicates the degree to which the classified data Di is similar to the characteristics of the class.

Similarities S_ConvVN2 and S_ClassVN regarding the outputs of the ConvVN2 layer 240 and the ClassVN layer 250 are also generated in the same manner as the similarity S_ConvVN1. It is not necessary to generate all of these three similarities S_ConvVN1, S_ConvVN2, and S_ClassVN, but it is preferable to generate one or more of them. In the present disclosure, the layer used to generate the similarity is also referred to as a "specific layer".

In step S230 of FIG. 3, the class classification processing section 112 presents to the user the similarities S_ConvVN1, S_ConvVN2, and S_ClassVN with the known feature spectrum group KSG, and the user confirms a result of the class classification processing, accordingly. As described above, the similarities S_ConvVN1, S_ConvVN2, and S_ClassVN with the known feature spectrum group KSG represent the degree to which the classified data Di is similar to the feature of the class corresponding to any label. Therefore, it is possible to confirm the quality of the result of the class classification processing from at least one of the similarities S_ConvVN1, S_ConvVN2, and S_ClassVN. The three steps S210 to S230 of the class classification step S200 are actually executed at substantially the same time.

As described above, in the present embodiment, the output vector $M^{L+1}_j$ of each node of the upper layer L+1 is obtained by (a) obtaining the prediction vector $v_{ij}$ based on the product of the output vector $M^L_i$ of each node of the lower layer L and the prediction matrix W ij, (b) obtaining the sum vector $u_j$ that is the linear combination of the prediction vector $v_{ij}$ obtained from each node of the lower layer L, (c) obtaining the activation value $a_j$, which is the normalization coefficient by normalizing the norm $|u_j|$ of the sum vector $u_j$, and (d) the arithmetic by dividing the sum vector $u_j$ by the norm $|u_j|$ and then multiplying by the activation value $a_j$. Therefore, unlike the capsule network, it is not necessary to execute the dynamic routine a plurality of times, so that there is an advantage that the arithmetic using the machine learning model 200 can be executed at a higher speed.

The method of generating the known spectrum group KSG and the method of generating the output data of the intermediate layer such as the ConvVN1 layer are not limited to the above embodiments, and for example, these data may be generated by using a Kmeans method. Further, the data may be generated by using conversion such as PCA, ICA, or Fisher. Further, the conversion method of the output data of the known spectrum group KSG and the intermediate layer may be different.

Other Embodiments

The present disclosure is not limited to the above embodiments, and can be realized in various aspects without departing from the spirit thereof. For example, the present disclosure can also be realized by the following aspects. The technical features in the above embodiments corresponding to technical features in each of the aspects described below can be replaced or combined as appropriate in order to solve some or all of the problems of the present disclosure, or achieve some or all of the effects of the present disclosure. Further, if the technical feature is not described as essential in the present specification, it can be appropriately deleted.

(1) According to a first aspect of the present disclosure, an information processing apparatus is provided. This information processing apparatus includes: a memory that stores a machine learning model of a vector neural network type; and one or more processors that execute an arithmetic operation using the machine learning model. The machine learning model has a plurality of vector neuron layers each including a plurality of nodes, when one of the plurality of vector neuron layers is referred to as an upper layer and a vector neuron layer below the upper layer is referred to as a lower layer, the one or more processors are configured to execute outputting one output vector by using output vectors from the plurality of nodes of the lower layer as an input for each node of the upper layer. The outputting includes: when any node of the upper layer is referred to as a target node, (a) obtaining a prediction vector based on a product of the output vector of each node of the lower layer and a prediction matrix, (b) obtaining a sum vector based on a linear combination of the prediction vectors obtained from each node of the lower layer, (c) obtaining a normalization coefficient by normalizing a norm of the sum vector, and (d) obtaining the output vector of the target node by dividing the sum vector by the norm and then multiplying the divided sum vector by the normalization coefficient.

According to this information processing apparatus, unlike the capsule network, it is not necessary to execute the dynamic routine a plurality of times, so that the arithmetic using the machine learning model can be executed at a higher speed.

(2) In the information processing apparatus, the normalization coefficient may be obtained by normalizing the norm with the normalization function so that the total sum of the normalization coefficients in the upper layer becomes 1.

According to this information processing apparatus, an appropriate normalization coefficient can be obtained by a simple arithmetic.

(3) In the information processing apparatus, a plurality of the prediction matrices are prepared, and the range of the plurality of nodes of the lower layer used for the arithmetic operation of the output vector of each node of the upper layer may be limited by convolution using the kernel having the plurality of prediction matrices as the plurality of elements, and the plurality of prediction matrices may be determined by performing the learning of the machine learning model.

According to this information processing apparatus, since the range of the arithmetic is limited by the kernel, the number of prediction matrices can be small, and an appropriate prediction matrix can be determined by the learning.

(4) In the information processing apparatus, the memory may store the known feature vector group obtained from the output of at least one specific layer of the plurality of vector neuron layers when a plurality of teacher data are input to the learned machine learning model. The machine learning model may have a similarity arithmetic section that performs the arithmetic operation of the similarity between the feature vector obtained from the output of the specific layer when new input data is input to the learned machine learning model and the known feature vector group.

According to this information processing apparatus, it is possible to confirm which of the plurality of teacher data the input data is similar to by using the similarity of the feature vectors.

(5) In the information processing apparatus, the specific layer has a configuration in which the vector neurons disposed in the plane defined by two axes of the first axis and the second axis are disposed as a plurality of channels along the third axis in a direction different from the two axes. The feature vector may be one of (i) a first type feature spectrum in which a plurality of element values of the output vector of the vector neuron at a plane position in one of the specific layers are arranged over the plurality of channels along the third axis, (ii) a second type feature spectrum obtained by multiplying each element value of the first type feature spectrum by the normalization coefficient, and (iii) a third type feature spectrum in which the normalization coefficient at one plane position of the specific layer is arranged over the plurality of channels along the third axis.

According to this information processing apparatus, the feature vector can be easily obtained.

(6) According to the second aspect of the present disclosure, there is provided an arithmetic method of executing arithmetic processing by using a machine learning model of a vector neural network type. The machine learning model has a plurality of vector neuron layers each including a plurality of nodes. When one of the plurality of vector neuron layers is referred to as an upper layer and a vector neuron layer below the upper layer is referred to as a lower layer, the one or more processors are configured to execute outputting one output vector by using output vectors from the plurality of nodes of the lower layer as an input for each node of the upper layer. The method causes the one or more processors to execute outputting one output vector by using output vectors from the plurality of nodes of the lower layer as an input for each node of the upper layer, and the outputting includes: when any node of the upper layer is referred to as a target node, (a) obtaining a prediction vector based on a product of the output vector of each node of the lower layer and a prediction matrix, (b) obtaining a sum vector based on a linear combination of the prediction vectors obtained from each node of the lower layer, (c) obtaining a normalization coefficient by normalizing a norm of the sum vector, and (d) obtaining the output vector of the target node by dividing the sum vector by the norm and then multiplying the divided sum vector by the normalization coefficient.

According to this arithmetic method, unlike the capsule network, it is not necessary to execute the dynamic routine a plurality of times, so that the arithmetic using the machine learning model can be executed at a higher speed.

(7) According to a third aspect of the present disclosure, there is provided a non-temporary computer-readable medium that stores instructions for causing one or more processors to execute arithmetic processing using a machine learning model of a vector neural network type. The machine learning model has a plurality of vector neuron layers each including a plurality of nodes, when one of the plurality of vector neuron layers is referred to as an upper layer and a vector neuron layer below the upper layer is referred to as a lower layer, the one or more processors are configured to execute outputting one output vector by using output vectors from the plurality of nodes of the lower layer as an input for each node of the upper layer. The instructions causes the one or more processors to execute outputting one output vector by using output vectors from the plurality of nodes of the lower layer as an input for each node of the upper layer, the outputting includes: when any node of the upper layer is referred to as a target node, (a) obtaining a prediction vector based on a product of the output vector of each node of the lower layer and the prediction matrix, (b) obtaining a sum vector based on a linear combination of the prediction vector obtained from each node of the lower layer, (c) obtaining a normalization coefficient by normalizing a norm of the sum vector, and (d) obtaining the output vector of the target node by dividing the sum vector by the norm and then multiplying the divided sum vector by the normalization coefficient.

According to this non-temporary computer-readable medium, unlike the capsule network, it is not necessary to execute the dynamic routine a plurality of times, so that the arithmetic using the machine learning model can be executed at a higher speed.

The present disclosure can also be realized in various forms other than the above. For example, it can be realized in a form of a computer program for realizing the function of the class classification device, a non-temporary storage medium in which the computer program is recorded, or the like.

What is claimed is:

1. An information processing apparatus comprising:

a memory that stores a machine learning model of a vector neural network type; and one or more processors that execute an arithmetic operation using the machine learning model, wherein the machine learning model has a plurality of vector neuron layers each including a plurality of nodes, when one of the plurality of vector neuron layers is referred to as an upper layer and a vector neuron layer below the upper layer is referred to as a lower layer, the one or more processors are configured to execute outputting one output vector by using output vectors from the plurality of nodes of the lower layer as an input for each node of the upper layer, the outputting including:

when any node of the upper layer is referred to as a target node, (a) obtaining a prediction vector based on a product of the output vector of each node of the lower layer and a prediction matrix, (b) obtaining a sum vector based on a linear combination of the prediction vectors obtained from each node of the lower layer, (c) obtaining a normalization coefficient by normalizing a norm of the sum vector, and (d) obtaining the output vector of the target node by dividing the sum vector by the norm and then multiplying the divided sum vector by the normalization coefficient.

2. The information processing apparatus according to claim 1, wherein the normalization coefficient is obtained by normalizing the norm with a normalization function so that a total sum of the normalization coefficients in the upper layer becomes 1.

3. The information processing apparatus according to claim 1, wherein a plurality of the prediction matrices are prepared, a range of the plurality of nodes of the lower layer used for an arithmetic operation of the output vector of each node of the upper layer is limited by convolution using a kernel which has the plurality of prediction matrices as a plurality of elements, and the plurality of prediction matrices are determined by performing learning of the machine learning model.

4. The information processing apparatus according to claim 1, wherein the memory stores a known feature vector group obtained from an output of at least one specific layer of the plurality of vector neuron layers when a plurality of teacher data are input to the learned machine learning model, and the one or more processors are configured to perform an arithmetic operation of a similarity between a feature vector obtained from the output of the specific layer when new input data is input to the learned machine learning model and the known feature vector group.

5. The information processing apparatus according to claim 4, wherein the specific layer has a configuration in which vector neurons disposed in a plane defined by two axes of a first axis and a second axis, are disposed as a plurality of channels along a third axis in a direction different from the two axes, and the feature vector is one of (i) a first type feature spectrum in which a plurality of element values of an output vector of a vector neuron at one plane position of the specific layer are arranged over the plurality of channels along the third axis, (ii) a second type feature spectrum obtained by multiplying each of the element values of the first type feature spectrum by the normalization coefficient, and (iii) a third type feature spectrum in which the normalization coefficient at one plane position of the specific layer is arranged over the plurality of channels along the third axis.

6. The information processing apparatus according to claim 1, wherein the normalization coefficient indicates a relative output intensity of the target node with respect to other nodes in the upper layer.

7. The information processing apparatus according to claim 1, wherein the normalization coefficient is obtained by applying a normalization function to the norm of the sum vector, the normalization function incorporating information regarding all nodes in the upper layer.

8. A method of causing one or more processors to execute arithmetic processing using a machine learning model of a vector neural network type, wherein the machine learning model has a plurality of vector neuron layers each including a plurality of nodes, when one of the plurality of vector neuron layers is referred to as an upper layer and a vector neuron layer below the upper layer is referred to as a lower layer, the method causing the one or more processors to execute outputting one output vector by using output vectors from the plurality of nodes of the lower layer as an input for each node of the upper layer, the outputting including:

when any node of the upper layer is referred to as a target node, (a) obtaining a prediction vector based on a product of the output vector of each node of the lower layer and a prediction matrix, (b) obtaining a sum vector based on a linear combination of the prediction vectors obtained from each node of the lower layer, (c) obtaining a normalization coefficient by normalizing a norm of the sum vector, and (d) obtaining the output vector of the target node by dividing the sum vector by the norm and then multiplying the divided sum vector by the normalization coefficient.

9. A non-temporary computer-readable medium that stores instructions for causing one or more processors to execute arithmetic processing using a machine learning model of a vector neural network type, wherein the machine learning model has a plurality of vector neuron layers each including a plurality of nodes, when one of the plurality of vector neuron layers is referred to as an upper layer and a vector neuron layer below the upper layer is referred to as a lower layer, the instructions causing the one or more processors to execute outputting one output vector by using output vectors from the plurality of nodes of the lower layer as an input for each node of the upper layer, the outputting including:

when any node of the upper layer is referred to as a target node, (a) obtaining a prediction vector based on a product of the output vector of each node of the lower layer and a prediction matrix, (b) obtaining a sum vector based on a linear combination of the prediction vectors obtained from each node of the lower layer, (c) obtaining a normalization coefficient by normalizing a norm of the sum vector, and (d) obtaining the output vector of the target node by dividing the sum vector by the norm and then multiplying the divided sum vector by the normalization coefficient.

* * * * *